United States Patent [19]

Marlatt, Sr.

[11] 4,016,905
[45] Apr. 12, 1977

[54] REGULATOR FOR LIQUEFIED PETROLEUM GAS SYSTEMS

[76] Inventor: John W. Marlatt, Sr., 2511 Abonado Place, Rowland Heights, Calif. 91748

[22] Filed: Feb. 6, 1976

[21] Appl. No.: 656,044

[52] U.S. Cl. .............................. 137/505.41; 137/630
[51] Int. Cl.² ........................................ F16K 31/12
[58] Field of Search ........ 137/110, 505.41, 505.42, 137/505.5, 505.13, 630

[56] References Cited
UNITED STATES PATENTS

| | | | |
|---|---|---|---|
| 788,352 | 4/1905 | Crawford | 137/505.42 |
| 844,946 | 2/1907 | Lowe | 137/505.41 |
| 3,117,591 | 1/1964 | Schutmaat | 137/505.41 |
| 3,576,193 | 4/1971 | Rothfuss | 137/505.13 X |

*Primary Examiner*—Harold W. Weakley
*Attorney, Agent, or Firm*—Nilsson, Robbins, Dalgarn & Berliner

[57] ABSTRACT

A regulator is disclosed for receiving gas from a variable-pressure supply, to safely provide gas as to consuming appliances, in demand quantities and at a regulated pressure. A valve body of the regulator provides a metering passage between high and low pressure chambers, the low pressure chamber being isolated from ambient pressure by a spring-biased diaphragm. A valve stem is affixed to the diaphragm so as to extend through the metering passage and support a valve member for operation in cooperation with a first valve seat that is defined contiguous to the metering passage in the valve body. The valve member also defines a second valve seat and is spring biased for sliding movement on the valve stem so as to provide two distinct valve actions for high and low pressure operation. Accordingly, relatively consistent pressure is maintained over a wide range of flow rates as well as variations in the supply pressure. Also, the configuration of the disclosed embodiment avoids the development of high pressures on the low side in the event it is exposed to excessively high pressures.

4 Claims, 4 Drawing Figures

REGULATOR FOR LIQUEFIED PETROLEUM GAS SYSTEMS

BACKGROUND AND SUMMARY OF THE INVENTION

Traditionally, gaseous fuel is supplied to various gas-consuming appliances at a controlled pressure. For example, current standards generally provide that gas shall be supplied to an appliance at a pressure of approximately ½ pound per square inch. Regulators of the prior art have functioned effectively to provide gas at such pressures from conventional gas line sources. However, special problems arise with the delivery of liquefied petroleum gas, the use of which is becoming widespread particularly in recreational vehicles.

One of the problems involved in the delivery of liquefied petroleum gas is that the pressure at the tank tends to vary widely, depending upon the temperature of the tank. For example, the pressure might vary from under 1 pound per square inch to over 100 pounds per square inch within the range of temperatures commonly encountered in different environments. Therefore, in the event of a gas supply regulator failure, traditional gas appliance regulators are not effective to reliably supply a demand flow of low pressure gas from a source of liquid petroleum gas under conditions of such variable pressure.

Conventionally, gas-burning appliances are certified for operation with gas that is supplied at a pressure of under 1 pound per square inch. If such a pressure is exceeded, considerable danger exists; and the likelihood for such an increase, as in the event of a gas supply regulator failure, is considerably greater in the use of liquefied petroleum gas. That is, a failure of the gas supply regulator may well result in the application of high pressure gas to an appliance causing the local control on the appliance to fail which may well result in fires or explosions. Accordingly, it may be seen that a considerable need exists for an improved appliance regulator for use with liquid petroleum gas supplies, which regulator will reliably and safely supply a demand quantity of low pressure gas to gas-burning appliances.

In general, the present invention is directed to an economical, safe, reliable, and convenient regulator for supplying a variable stream of gas from a variable-pressure source to a low pressure appliance. The regulator of the present invention incorporates a dual-function structural arrangement affording separate valving action for delivering gas from a source of gas at varying pressure yet with the economy and safety of a singular mechanism.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment herein. Consequently, the specific structural and functional details disclosed herein are merely representative, yet in that regard they are deemed to provide the best embodiment for purposes of disclosure and to establish a foundation as a basis for the claims herein which define the scope of the present invention.

Figure 1:
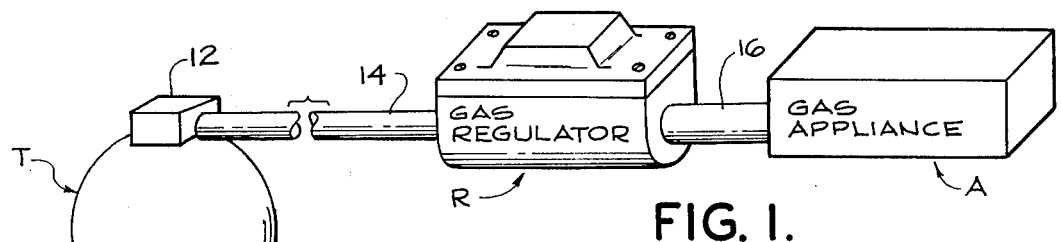
FIG. 1 is a diagrammatic representation of a system incorporating a gas regulator in accordance with the present invention.

Referring initially to FIG. 1, there is shown a liquid petroleum gas tank T for supplying gaseous fluid from a contained liquid reservoir through a regulator R to one or more gas appliances A. The function of the regulator R is to maintain the pressure of gas supplied to the appliance A within a predetermined range, even if the gas received from the tank T varies over a much greater pressure range; and the demand by the appliance A also varies.

The tank T supplies gas through a delivery mechanism 12 to a supply line 14 affording an inlet to the gas regulator R. As suggested above, the pressure in the tank T may vary from under 1 pound per square inch to well above 100 pounds per square inch. Accordingly, a wide range of pressures may occur in the supply line 14 in the event of a malfunction of the mechanism 12.

The gas regulator R delivers gas to an outlet line 16 which is in turn connected to the gas appliance A. In an exemplary system, the gas in the line 16 is to remain at approximately 1/2 pound per square inch regardless of the demand by the appliance A.

Figure 2:
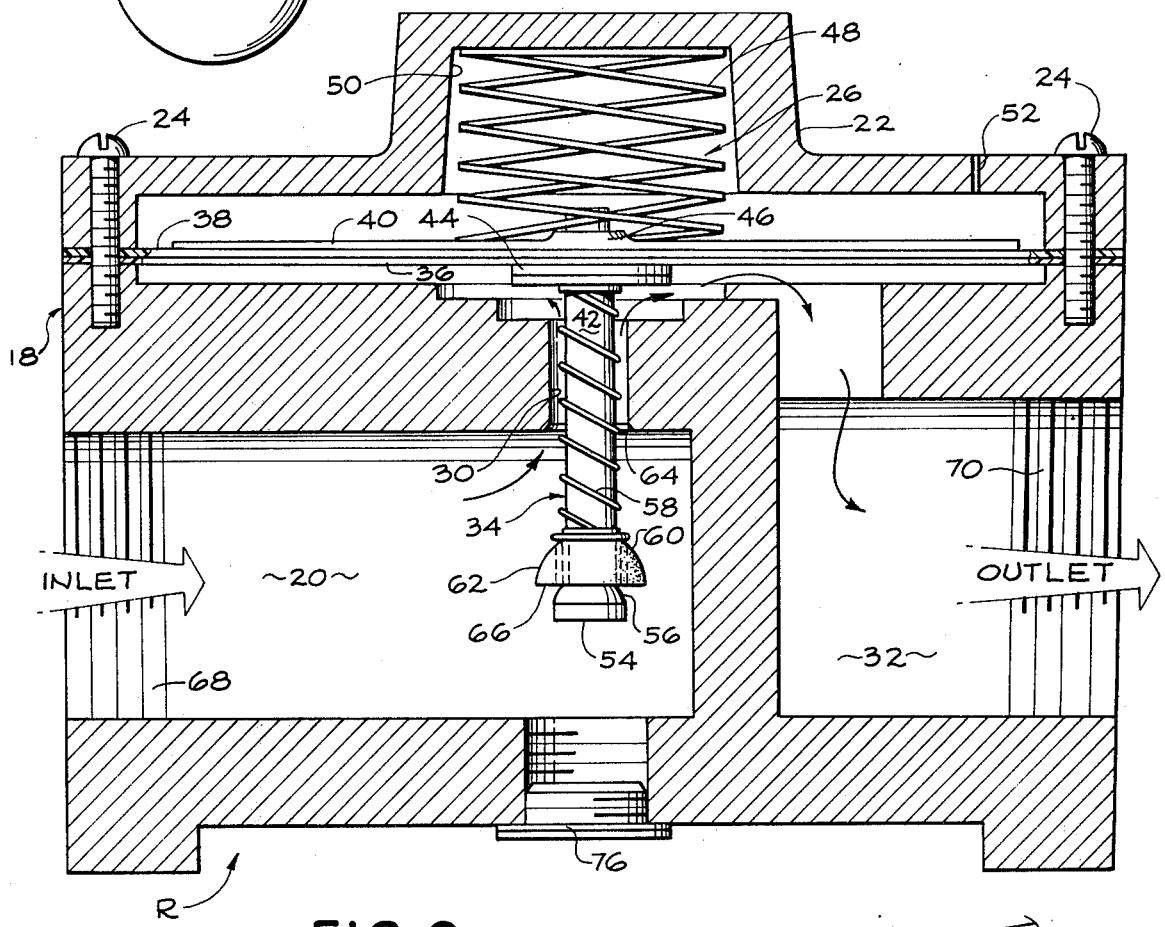
FIG. 2 is a vertical sectional view of the gas regulator of FIG. 1, constructed in accordance with the present invention.
Figure 4:
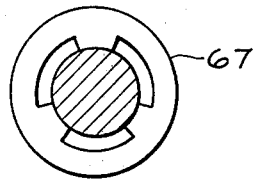
FIG. 4 is a sectional view taken along line 4—4 of FIG. 3.

Considering the gas regulator R in greater detail, reference will now be made to FIG. 2 which illustrates the internal operating components of that control apparatus. The regulator R is housed by a valve body 18 which receives a cover 22 affixed thereon by threaded studs 24. An intake section 20 joins a metering passage 30 which in turn communicates with an outlet section 32. A space above the body 18 is closed by the cover 22 and contains a control diaphragm apparatus 26.

Pursuing the structure in greater detail, the body 18 defines the section 20 as the high pressure intake space from which gas passes through the metering passage 30 to enter the low pressure chamber or outlet section 32. The flow of gas through the metering passage 30 is regulated by the direct operation of a valving mechanism or apparatus 34 motivated by the diaphragm apparatus 26. Considering the operation somewhat preliminarily, as the diaphragm apparatus 26 moves upwardly (reflecting an increased pressure in the section 32) the valving apparatus 34 restricts the metering orifice 30 so as to reduce the flow and thereby restore the desired pressure level. Opposite pressure variations to those assumed above are compensated by an opposed displacement, again to regulate the pressure in the section 32.

Considering the structure of the disclosed embodiment in somewhat greater detail, the diaphragm apparatus 26 includes a flexible diaphragm 36, the periphery of which is fixed between the body 18 and the cover 22 along with a coincident sealing gasket 38. The diaphragm 36 and the gasket 38 may be formed of resiliently deformable materials, with the diaphragm 36 being imperforate.

A metallic washer 40 is mounted above the central portion of the diaphragm 36 to pass a stub shaft 42 which is a major component of the valving apparatus 34. The upper end of the shaft 42 extends respectively through a sealing gasket 44, the diaphragm 36, the cover 38, and the washer 40 to receive a speed nut 46 to effect the coupling. A coil spring 48 extends upwardly from a central portion of the diaphragm 36 and is received in an inverted spring well 50 which is defined in the cover 22. Accordingly, the diaphragm 36 is spring biased (downwardly). That is, the ambient pressure applied to the diaphragm 36 through an atmospheric vent 52 is supplemented by the force of the spring 48. In general, the force of the upper spring is related to the diaphragm area and the desired outlet pressure. However, that relationship fails to account for the pressure which is applied at the lower end surfaces of the valving apparatus as considered in greater detail below.

The central shaft 42 of the valving apparatus 34 extends from the gasket 44 downwardly through the passage 30 to a terminal end 54, above which the shaft defines a short flared valve section 56. A coil spring 58 is concentrically carried on the shaft 42 being supported between the gasket 44 and a slider 60 which is also carried on the shaft 42 and defines a flared annular skirt 62.

In view of the above description of the structure in the illustrative embodiment, an understanding of the operation thereof may now best be accomplished by assuming certain physical conditions and explaining the resultant operation of the regulator. Accordingly, assume initially that the pressure in the chamber 20 is relatively low yet a substantial demand exists for the supply of gas from the chamber 32. Under such circumstances, the configuration of the diaphragm 36 and the valve apparatus 34 may be substantially as depicted in FIG. 2. Under those circumstances, the pressure in the chamber 32 (under the diaphragm 36) would be balanced by the spring 48 to provide the desired output pressure in the chamber 32. In the event that the demand or flow from the chamber 32 decreases, resulting in an increased pressure, the spring 48 yields with the result that the valving apparatus moves upwardly bringing the flared skirt 62 of the slider 60 into cooperative relationship with the seat 64 thereby reducing the flow through the metering passage 30 to restore the desired outlet pressure in the chamber 32. Of course, a pressure variation opposed to that assumed above would result in an opposed compensating action.

It is to be noted that in the operation as described above, the variable pressure which is applied to the terminal end 54 (as well as the parallel surface of the slider 60) is not compensated by the action of the spring 48. As a consequence the advent of a high pressure in the chamber 20 (as with the high pressure of a liquid petroleum gas source) results in a considerable pressure (applied on the end 54) to raise the shaft 42 somewhat independently of the pressure acting directly on the diaphragm 36. Therefore, it will be apparent that at some point, the pressure so applied in a conventional regulator may close the metering passage, thereby cutting off the flow of gas independently of the actual demand. However, in the regulator of the present invention, an alternative valving action occurs with the result that gas continues to be supplied even though the source pressure attains a level well above the capacity of the valving apparatus 34 in the operation as described above.

Figure 3:
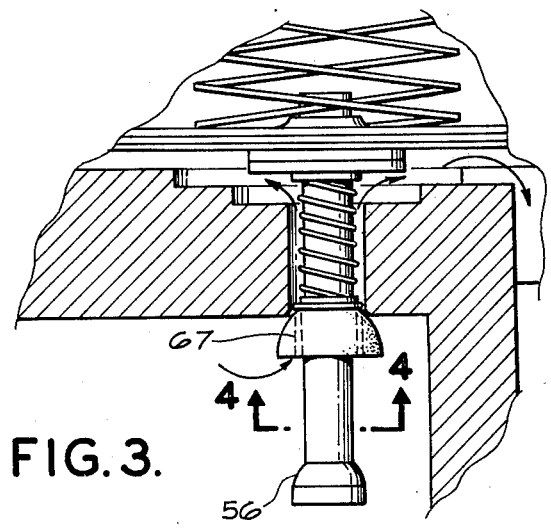
FIG. 3 is a fragmentary view of the structure of FIG. 1 illustrating component parts in a different configuration.

As indicated above, high pressures in the chamber 20 are unbalanced on the terminal end 54 and the annular surface 66 of the slider 60. However, in view of the relative compressibility of the springs 48 and 58, the pressure on the annular surface 66 displaces the slider 60 upwardly to the point of finally engaging the seat 64 as depicted in FIG. 3. In such a configuration, the annular surface 66 of the slider 60 then becomes the operating valve seat for cooperative relationship with the flared section 56 of the shaft 42. During such operation, the effective metering passage becomes the space 67 between the shaft 42 and the slider 60. It may, therefore, be seen that the present invention affords dual valving actions utilizing the same diaphragm and valve stem with a relatively simple mechanism.

Although regulators embodying the present invention may be variously constructed, the illustrative embodiment involves no unduly complex manufacturing techniques. For example, the valve body 18 may simply be cast (as well might the cover 22) using common foundry techniques. These component parts may involve subsequent machining as to accomplish an inlet threaded section 68, an outlet threaded section 70, threaded bores for the studs 24, an accurate seat 64, and a threaded section for a sealing cup 76.

With the completion of the body 18 and the cover 22, the valve apparatus 34 and the diaphragm apparatus 26 may be assembled utilizing readily available component parts. The shaft 42 may be variously formed, for example, of brass or stainless steel; and the slider 60 may be formed, for example, of rubber or other resiliently deformable materials. Assembly is completed with the placement of the studs 24 and the cap 76.

In view of the above, it may be seen that the regulator of the present invention affords an effective, two-stage apparatus which is particularly effective in the regulation of liquid petroleum gas. It may also be appreciated that the system is economical, rugged, maintenance free, and effective over a wide range of input pressures to deliver gas in accordance with variable demands at a relatively consistent pressure for consumption. As indicated, the system may be variously embodied to accomplish these and other desired functions. Recognizing various modifications will be apparent, the scope hereof shall be deemed to be defined by the claims as set forth below.

What is claimed is:

1. A regulator, as for use in a fluid system, comprising:

a valve body defining a high pressure chamber, a vented low pressure chamber and a passage between said chambers with a contiguous first valve seat;

a spring-biased diaphragm means affixed to said valve body for closing said vented low pressure chamber;

a valve stem means affixed to said diaphragm means and extending through said passage so as to be variously positioned therein under control of said diaphragm, said valve stem means including a stud affixed to extend coaxially from said diaphragm means, valve member means slidably disposed on said valve stem for cooperation with said first valve seat to regulate the flow of gas through said passage from said high pressure chamber to said low pressure chamber, said valve member means defining a second valve seat for cooperation with said valve stem means whereby a pair of concentric valves are provided in said regulator on said valve stem means, and a coil spring mounted on said stud between said valve member means and said diaphragm to spring bias said valve member.

2. A regulator according to claim 1 wherein said spring-biased diaphragm means comprises a diaphragm affixed to said valve body to receive the pressure of said low pressure chamber on a side adjacent said valve stem means and ambient pressure on the other side, and further includes a spring means for urging said diaphragm toward said low pressure chamber.

3. A regulator according to claim 1 wherein said valve stem means defines a flared section adjacent said second valve seat.

4. A regulator according to claim 1 wherein said stud defines a flared section remote from said diaphragm for cooperation with said second valve seat.

* * * * *